(12) United States Patent
Shaw et al.

(10) Patent No.: US 12,432,525 B2
(45) Date of Patent: Sep. 30, 2025

(54) ACTIVE INFORMATION FOR USER DEVICES FOR IMPROVED SERVICE DELIVERY

(71) Applicant: DELL PRODUCTS L.P., Round Rock, TX (US)

(72) Inventors: Rowland Shaw, Chester, NH (US); Qing Ye, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 366 days.

(21) Appl. No.: 18/194,432

(22) Filed: Mar. 31, 2023

(65) Prior Publication Data

US 2023/0319506 A1 Oct. 5, 2023

Related U.S. Application Data

(63) Continuation-in-part of application No. 17/711,531, filed on Apr. 1, 2022, and a continuation-in-part of application No. 17/711,577, filed on Apr. 1, 2022, now Pat. No. 12,154,223.

(51) Int. Cl.
| | |
|---|---|
| *H04W 64/00* | (2009.01) |
| *G01S 17/89* | (2020.01) |
| *G06T 17/05* | (2011.01) |
| *H04W 4/024* | (2018.01) |
| *H04W 24/08* | (2009.01) |

(52) U.S. Cl.
CPC ............. *H04W 4/024* (2018.02); *G01S 17/89* (2013.01); *G06T 17/05* (2013.01); *H04W 24/08* (2013.01); *H04W 64/00* (2013.01)

(58) Field of Classification Search
None
See application file for complete search history.

(56) References Cited

U.S. PATENT DOCUMENTS

| | | |
|---|---|---|
| 9,565,518 B2 | 2/2017 | Terrazas |
| 2022/0378269 A1* | 12/2022 | Kim ...................... H04W 24/02 |

\* cited by examiner

*Primary Examiner* — Suhail Khan
(74) *Attorney, Agent, or Firm* — Larson Newman, LLP

(57) ABSTRACT

A data communication network includes a data communication node, an imaging device, and an information handling system. The data communication node establishes a data connection with a user equipment device. The imaging device provides image information for a coverage area associated with the data communication node. The information handling system is coupled to the data communication node and to the imaging device. The information handling system receives the image information, synthesizes a 3D map of the coverage area based upon the image information, receives first coverage information from the first data communication node, correlates the first coverage information with the 3D map to generate a coverage map of the coverage area, to generate a first connectivity pattern associating a quality of connectivity provided by the first data communication node within the coverage area, and determines a first location of the first user equipment device within the connectivity pattern based on the image information.

20 Claims, 5 Drawing Sheets

ACTIVE INFORMATION FOR USER DEVICES FOR IMPROVED SERVICE DELIVERY

CROSS-REFERENCE TO RELATED APPLICATIONS

This application is a Continuation-in-part of U.S. patent application Ser. No. 17/711,531 entitled "REAL-TIME 3D LOCATION SERVICE FOR DETERMINISTIC RF SIGNAL DELIVERY," filed Apr. 1, 2022 and U.S. patent application Ser. No. 17/711,577 entitled "REAL-TIME 3D TOPOLOGY MAPPING FOR DETERMINISTIC RF SIGNAL DELIVERY," filed Apr. 1, 2022, the disclosure of which is hereby expressly incorporated by reference in its entirety.

Related subject matter is contained in co-pending U.S. patent application Ser. No. 18/194,475 entitled "PRECISE POSITIONING SYSTEM FOR INDOOR GPS AND RF COMPROMISED ENVIRONMENT MAPPING," filed Mar. 31, 2023, the disclosure of which is hereby incorporated by reference.

FIELD OF THE DISCLOSURE

This disclosure generally relates to communication systems, and more particularly relates to providing active information for user devices for improved service delivery in a data communication network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data communication network may include a data communication node, an imaging device, and an information handling system. The data communication node may establish a data connection with a user equipment device. The imaging device may provide image information for a coverage area associated with the data communication node. The information handling system may be coupled to the data communication node and to the imaging device. The information handling system may receive the image information, synthesize a 3D map of the coverage area based upon the image information, receive first coverage information from the first data communication node, correlate the first coverage information with the 3D map to generate a coverage map of the coverage area, to generate a first connectivity pattern associating a quality of connectivity provided by the first data communication node within the coverage area, and determine a first location of the first user equipment device within the connectivity pattern based on the image information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
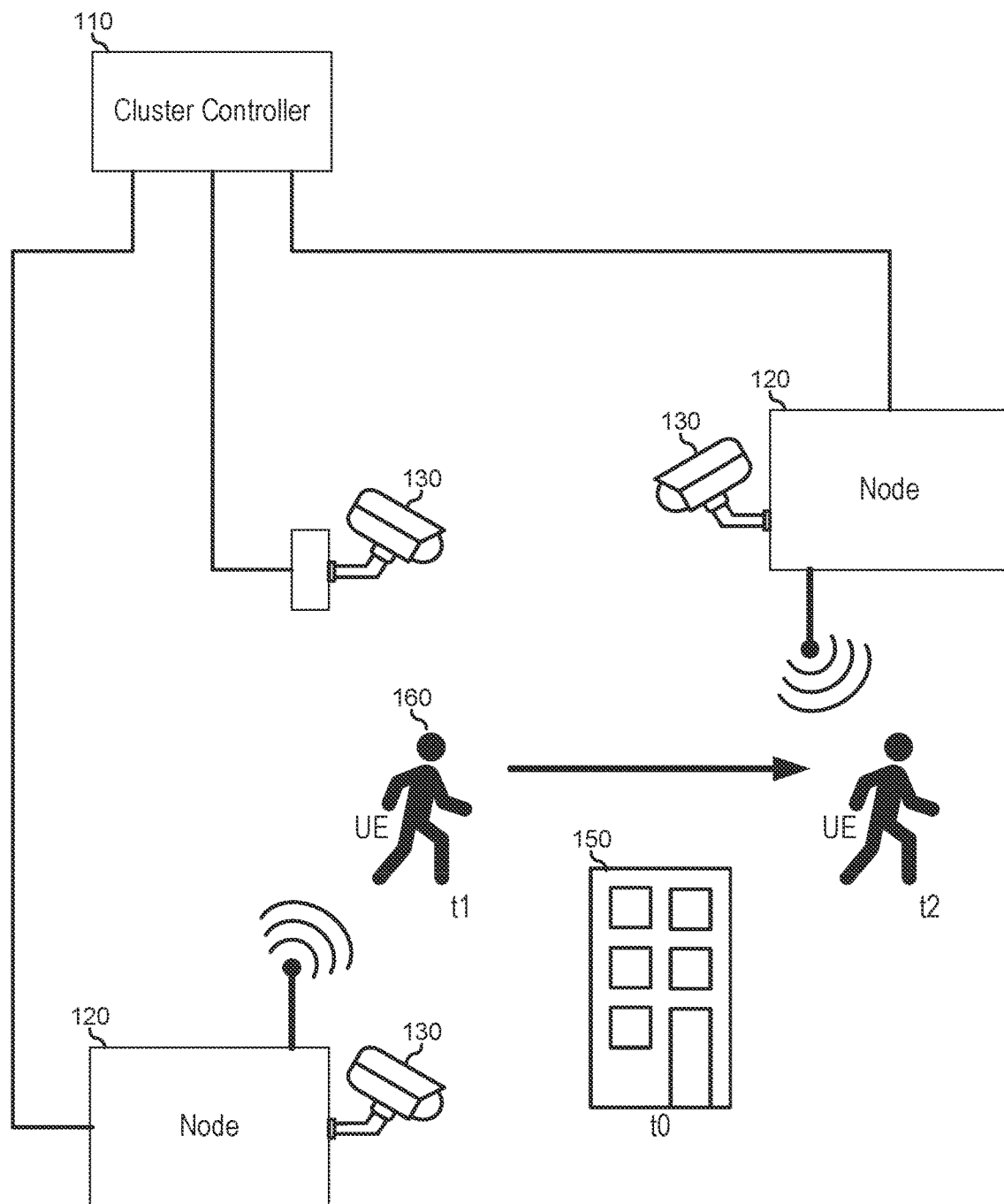
FIG. 1 is a block diagram illustrating a data communication network according to an embodiment of the current disclosure.

FIG. 1 illustrates a data communication network 100, including a cluster controller 110, one or more data communication nodes 120, and one or more imaging devices 130. Data communication network 100 represents a distributed communication network, such as a cellular network for communicating with a distributed set of user equipment (UE) 160. For example, data communication network 100 may represent a fifth generation (5G) cellular network, a WiFi network, a wireless Wide Area Network (WAN), another type of data communication network, or the like. UE 160 may represent 5G enabled mobile cellular devices, Internet-of-Things (IoT) devices, machine-to-machine interconnected devices, or the like. In a particular embodiment data communication nodes 120 represent cellular communication nodes, and may be operated, managed, and maintained in conformance with a particular cellular infrastructure standard, such as the Common Public Radio Interface (CPRI) standard, where the data communication nodes include Radio Equipment (RE) components configured to provide wireless data communications in accordance with a particular wireless data protocol, and Radio Equipment Control (REC) components configured to control the RE and to provide connectivity to the broader cellular data network infrastructure.

The details of data communication over a data communication network, and particularly the wireless communication over, for example, a cellular data communication network are known in the art and will not be described further herein, except as needed to illustrate the current embodiments. UE 160 may represent any device that is configured to communicate within data communication network 100, and particularly with nodes 120. For example, UE 160 may include a cell phone, a tablet device, a computer device such as a laptop computer or a desktop computer, a mobile device such as a vehicle-based communication system, an IoT device, or the like.

Nodes 120 are each connected to cluster controller 110. Here, cluster controller 110 operates to provide monitoring, management, and maintenance services to nodes 120, as needed or desired. Cluster controller 110 may be understood to be provided at a location that is proximate to nodes 120, or may be understood to be provided at a central location for data communication network 100, such as a data center associated with the data communication network, and the functions and features of the cluster controller may be performed by a single common information handling system, or by one or more distributed information handling systems, as needed or desired. The monitoring, management, and maintenance of data communication networks are known in the art and will not be described further herein, except as needed to illustrate the current embodiments.

Data communication network 100 is configured such that one or more of nodes 120 include integrated or stand-alone imaging devices 130. Data communication network 100 is further configured to include one or more additional imaging device 130 that are not directly associated with a particular node, but operate in a stand-alone capacity. Whether associated with a node, or operating as a stand-alone device, imaging devices 130 represent devices that are located and configured to provide still picture and video monitoring of a RF coverage area of data communication network 100. Imaging devices 130 may include visual light detection devices, invisible light detection devices such as infrared cameras, lidar systems, and the like, radar imaging devices, or the like, sound imaging devices, or other types of devices which may be utilized to generate topological information, as described below. In either case, cluster controller 110 operates to provide monitoring, management, and maintenance services to imaging devices 130, as needed or desired.

In a particular embodiment, cluster controller 110 operates to receive image information from the field of view of imaging devices 130, and RF coverage information from nodes 120. Cluster controller 110 utilizes the image information and the RF coverage information to synthesize a 3D map of the physical topology of the RF coverage area of data communication network 100. Cluster controller 110 then correlates the connection status for nodes 120 with the various components of UE 160 that are connected to data communication network 100 within the field of view of each of the imaging devices with the 3D map of the physical topology of the RF coverage area. In particular, cluster controller 110 determines when a particular component of UE 160 experiences a diminished or dropped connection, and correlates the locations where the UE experiences the diminished or dropped connections with the 3D map of the physical topology of the RF coverage area. In this way, cluster controller 110 operates to identify features 150 within the 3D map of the physical topology of the RF coverage area that may attenuate or block the connection between a particular node 120 and UE 160.

For example, cluster controller 110 may operate to determine that a particular node 120 has no current connections with an UE 160, and to correlate the image information provided by imaging devices 130 within the RF coverage area of that node, including any imaging device associated with the node and any imaging device that is a stand-alone imaging device that has a field of view that covers the RF coverage area of the node. In this way, cluster controller 110 can synthesize a 3D map of the RF coverage area of each of nodes 120 into a 3D map of features 150 within the RF coverage area of data communication network 100.

When a particular component of UE 160 is connected to particular node 120, such a connection will be maintained by the node until such time as the connection is interrupted, for example by the UE moving out of range of the node or entering a coverage dead zone for the node. However, nodes 120 typically are not aware of when a connection is lost, and when a component of UE 160 loses coverage, the UE will typically initiate a process to initiate other connection options with a first node 120, or to establish a new connection with another node 120. That is, the connection of UE 160 with nodes 120 is typically reactive from the perspective of the nodes. However, such a reactive approach may lead to poor performance from the perspective of UE 160 due to the poor link performance between the detection of the loss of connection with a first node 120 and the establishment of a new connection with a second node 120.

In establishing and maintaining the connection between a node 120 and a component of UE 160, a typical node in a data communication network will provide the communication signals to the UE utilizing a multiple-input/multiple-output (MIMO) antenna array, and will attempt to provide the communication signals by beamforming the signals with the antenna array to maximize the received signal strength by the UE while also minimizing the power output of the communication signal by the node. A node may employ various algorithms, along with feedback from the UE to shift the beamforming activities to maintain an optimal signal between the node and the UE. The details of establishing, maintaining, and optimizing data communication connections between nodes of a data communication network and the UE within the data communication network are known in the art and will not be described further herein, except as needed to illustrate the current embodiments.

In a particular embodiment, cluster controller 110 operates to correlate the image information from imaging devices 130 with the beamforming information from nodes 120 to identify and manage the targets of the connections between the nodes and the various UE 160 within the RF coverage area of the nodes and data communication network 100. Cluster controller 110 further utilizes motion information to predict the future motion of UE 160 within data communication network 100.

Cluster controller 110 operates to proactively direct the node 120 associated with a particular component of UE 160 to provide beamforming parameters to improve the communication signal to the UE and to improve the efficiency of the node in delivering communication signals to the UE. Moreover, utilizing the 3D map of the RF coverage areas of nodes 120, cluster controller 110 operates to predict when a component of UE 160 will enter a particular node's dead or highly attenuated zone, and to proactively hand off communications with that UE by another node that has a suitable RF path to that UE. In this way, degradation in connectivity between the components of UE 160 and data communication network 100 can be improved, and the user may not experience disruptions in coverage, as data communication network 100 actively manages the connections between nodes 120 and UE 160 by altering the beamforming parameters.

In another embodiment, cluster controller 110 operates to proactively allocate data bandwidth between nodes 120 based upon spatial insights from the visual information. For example, if the RF coverage area of a particular node 120 is seen to be sparsely populated with UE 160, and another node is seen to be heavily populated with UE, cluster controller 110 can operate to allocate more data bandwidth to the heavily populated node if there remains a line of sight to direct the RF beam to the UEs associated with the heavily populated node. Moreover, based upon historical information, future bandwidth may be prepared for other nodes 120 within data communication network 100. For example, consider an event venue that is emptying out after an event. It may be understood that the UE 160 associated with the event-goers may be expected to move from the event venue to nearby parking structures and on to adjacent roadways, and cluster controller 110 can operate to shift the backend data bandwidth to the core network between the associated nodes 120 near the venue, the parking structures, and the adjacent roadways to meet the anticipated usage pattern. In another embodiment, cluster controller 110 operates to correlate the users' of particular UE 160 with their associated service level agreements (SLAs), and to allocate data bandwidth with the UE accordingly.

In a particular embodiment, cluster controller 110 utilizes artificial intelligence/machine learning (AI/ML) algorithms to analyze the image information to monitor and maintain the 3D map. For example, while features 150 may typically be understood to represent fixed features, such as buildings or other fixed signal obstructions, utilizing AI/ML algorithms, cluster controller 110 may add real-time RF path obstructions to the 3D map of the RF coverage area of nodes 120. Consider a large mobile obstruction, such as a bus or large truck, moving through a particular node's 120 RF coverage area. Cluster controller 110 may operate to improve the real-time maintenance of connectivity, such as dead zone detection, rapidly changing RF environment, and beamforming activities, to better account for the mobile obstruction to the RF paths. It may be further understood that other real-time RF path obstructions may be identified, such as human bodies or animals within the 3D map. Further, utilizing the AI/ML algorithms, cluster controller 110 can operate to predict processing needs for the RF coverage area of nodes 120, and increase or decrease backend processing capacity to meet the changing demand profile.

As described herein, the functions and features of cluster controller 110 may instantiated in hardware, in software or code, or in a combination of hardware and code configured to perform the described functions and features. Moreover, the functions and features may be provided at a single location or by a single device, such as an information handling system, or may be provided at two or more locations by two or more devices, such as by two or more information handling systems. One or more of the functions and features as described herein may be each performed by a different information handling system, and any particular function or feature may be distributed across two or more information handling systems, as needed or desired. Further, as described herein, the functions and features of cluster controller 110 may be understood to be provided at any network level as needed or desired.

For example, where data communication network 100 includes separate groups of nodes 120, where each group of nodes is routed through a common access switch, where the data flows from separate groups of access switches are aggregated by a common aggregator, where the processing demands of groups of aggregators are processed by a core data processing network, then the functions and features of cluster controller 110 may provided by one or more of the access switches, the aggregators, or the core network, as needed or desired. As such, it may be deemed desirable to perform map synthesis at the core network, where access times are typically longer, but data processing capacities are typically greater, whereas it may be deemed desirable to perform UE motion tracking and connection hand-offs at a processing level that is closer to the nodes, where access times are typically shorter.

Figure 2:
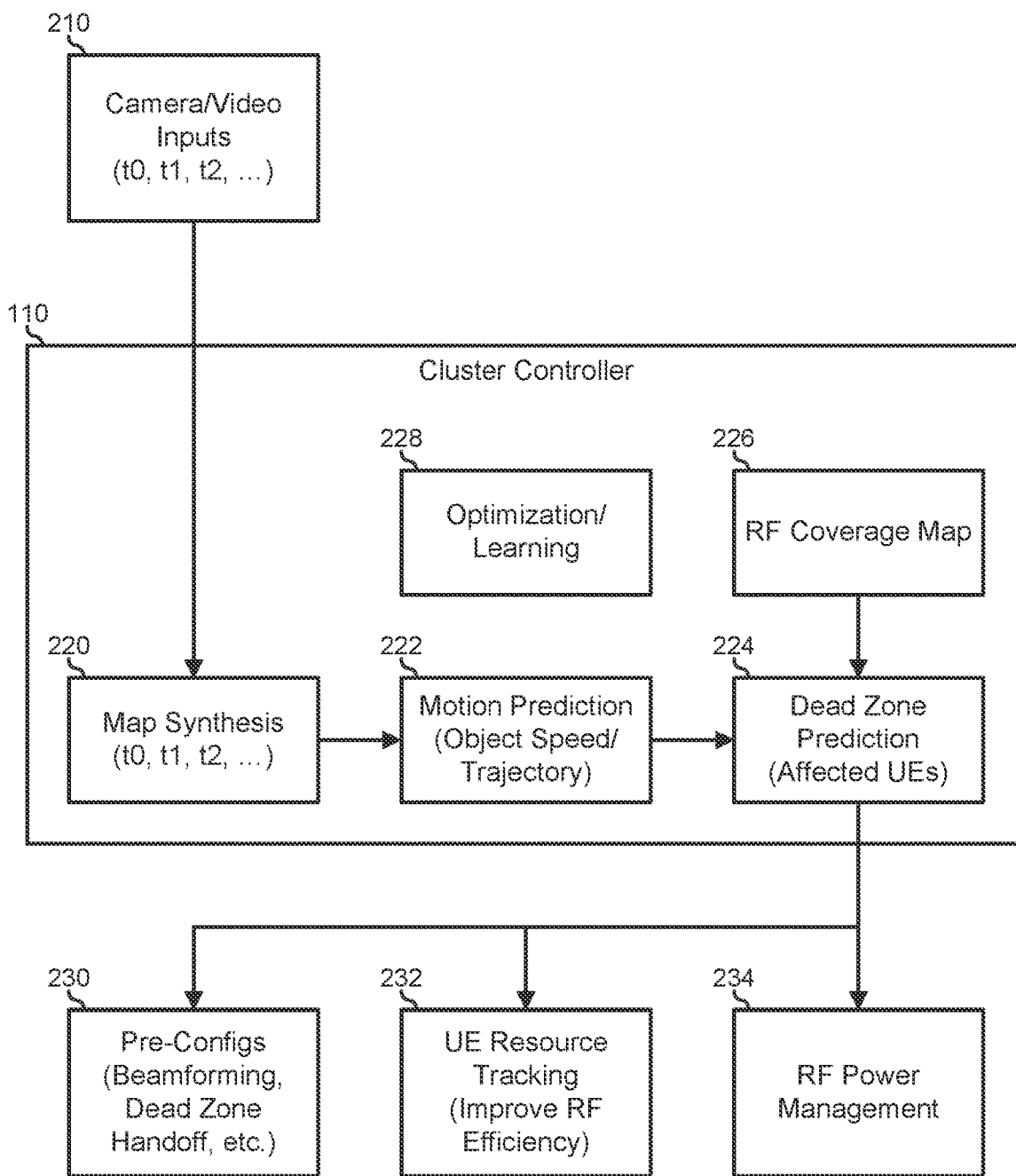
FIG. 2 is a block diagram illustrating a cluster controller of the data communication network of FIG. 1.

FIG. 2 illustrates cluster controller 110 in greater detail. Cluster controller 110 is configured to receive imaging inputs 210 from imaging devices 130. Cluster controller 110 operates to process the imaging inputs and to control the operations of nodes in data communication network 100 including nodes 120. Cluster controller 110 further operates to provide the nodes with pre-configurations 230, resource tracking 232 of UEs within data communication network 100 including UE 160, and RF power management 234 for the nodes.

Imaging inputs 210 represent the output from imaging devices 130, and may include any still or motion imaging format as may be known in the art, including proprietary still or motion imaging formats. Where a particular imaging device 130 is configured to still images (that is, a camera device), the images will be understood to be received by cluster controller based upon various time stamps (t0, t1, t2, . . . ) that are associated with a real-time at which the still images were captured. Still image imaging devices 130 may be configured to capture images on a predetermined time schedule, such as once every five or ten seconds, or may be configured to capture images based upon various inputs to the imaging device, such as based upon a motion sensor or the like. Video image imaging devices may be configured to provide continuous stream video images or may be configured to provide video images based upon the various time stamps (t0, t1, t2, . . . ). Imaging devices 130 may be configured to capture images within the visible light spectrum, within the near-visible light spectrum, or at other non-visible light spectrums as needed or desired.

Cluster controller 110 includes a map synthesis module 220, a motion prediction module 222, a dead zone prediction module 224, a RF coverage map module 226, and an optimization/learning module 228. Map synthesis module 220 receives imaging inputs 210 and synthesizes a 3D map of the RF coverage area of data communication network 100 as described above. Here it will be understood that inputs from two or more imaging devices 130 will be utilized to synthesize the 3D map of the RF coverage area of data communication network 100, and that the more imaging device inputs that are received by cluster controller 110, the better and more accurate will be the 3D map synthesized by map synthesis module 220. Cluster controller 110 further receives coverage information from nodes 120. For example, cluster controller 110 may receive RF signal intensity maps 226 for the RF coverage areas associated with each node 120, including default beamforming settings, coverage angles, RF signal power settings, and the like. Here, dead zone prediction module 224 operates to correlate the synthesized 3D map with the received coverage information to generate a baseline RF coverage map that predicts the presence of features 150 that are understood to present obstacles that attenuate the RF signals between nodes 120 and UE 160.

In a particular embodiment, the baseline RF coverage map is synthesized based upon real-time information from imaging devices 130. In particular, it will be understood that a particular RF coverage area for a particular node 120 may be constantly populated by one or more UE 160, and other objects within the field of view of imaging devices 130 that may make the generation of the baseline RF coverage map difficult. However, here, map synthesis module 220 may utilize optimization/learning module 228 to create the baseline RF coverage map for the hypothetical situation where the RF coverage area is empty of UEs 160 and other objects based upon learned responses from the RF coverage area. Further, map synthesis module 220 operates to periodically update the baseline RF coverage map based upon the changing conditions within the RF coverage area. For example, where a RF coverage area represents an event venue, the presence of moving vans in a loading area may represent temporary obstructions within the coverage area of nodes 120 within line of sight of the loading area. Or, where a RF coverage area represents an office space, a reorganization of cubicles within the office space may militate for an updated coverage map for the office area.

Cluster controller 110 further utilizes artificial intelligence/machine learning (AI/ML) algorithms embodied in optimization/learning module 228 to analyze the image information to monitor and maintain the baseline RF coverage map. For example, while features 150 may typically be understood to represent fixed or semi-permanent features, such as buildings, parked vehicles, or other fixed signal obstructions, utilizing AI/ML algorithms, cluster controller 110 may add real-time RF path obstructions to the baseline RF coverage map of the RF coverage area of nodes 120. Consider a large mobile obstruction, such as a bus or large truck, moving through a particular node's 120 RF coverage area. Cluster controller 110 may operate to improve the real-time maintenance of connectivity, such as dead zone detection, rapidly changing RF environment, and beamforming activities, to better account for the mobile obstruction to the RF paths. Further, utilizing the AI/ML algorithms, cluster controller 110 can operate to predict processing needs for the RF coverage area of nodes 120, and increase or decrease backend processing capacity to meet the changing demand profile.

This baseline RF coverage map can be utilized in conjunction with the motion of objects within the RF coverage area as determined by motion prediction module 222. As such the movement of vehicles, people, and the like, through the RF coverage area can be predicted. Movement detection module 222 further operates to identify the speed and trajectory of the objects, and can thereby distinguish between people and vehicles or other objects within the RF coverage area. Then, based upon the map information from map synthesis module 220 and the object and motion information from object detection module 222, dead zone prediction module 224 operates to predict coverage dead zones for each of nodes 120. The dead zones can be combined with information from a pre-determined RF coverage map module 226 to predict the real-time dead zones for each of nodes 120.

Returning to motion prediction module 222, the movement of objects through the RF coverage areas of nodes 120 is combined with information related to each node's beamforming status for the UEs 160 in the RF coverage area. Motion prediction module 222 further operates to identify objects that are within the RF coverage area of each node 120 that are associated with users of UE 160, and the users' speed and trajectory. Dead zone prediction module 224 further operates to correlate the movements of UEs 160 with the identified dead zones to determine in advance when a particular UE is expected to lose connection with a particular node 120, and further operates to determine a next best node to pass the UE to. Optimization/learning module 228 utilizes various AI/ML algorithms to better predict the emergence of signal blocking obstructions and the expected motions of the users of the connected UEs 160. Cluster controller 110 finally operates to direct the activities of nodes 120 to proactively maintain an optimum connection status for the UEs within the RF coverage area of data communication network 100, through the implementation of pre-configurations 230, UE resource tracking 232, and RF power management of the nodes, as described above.

Figure 4:
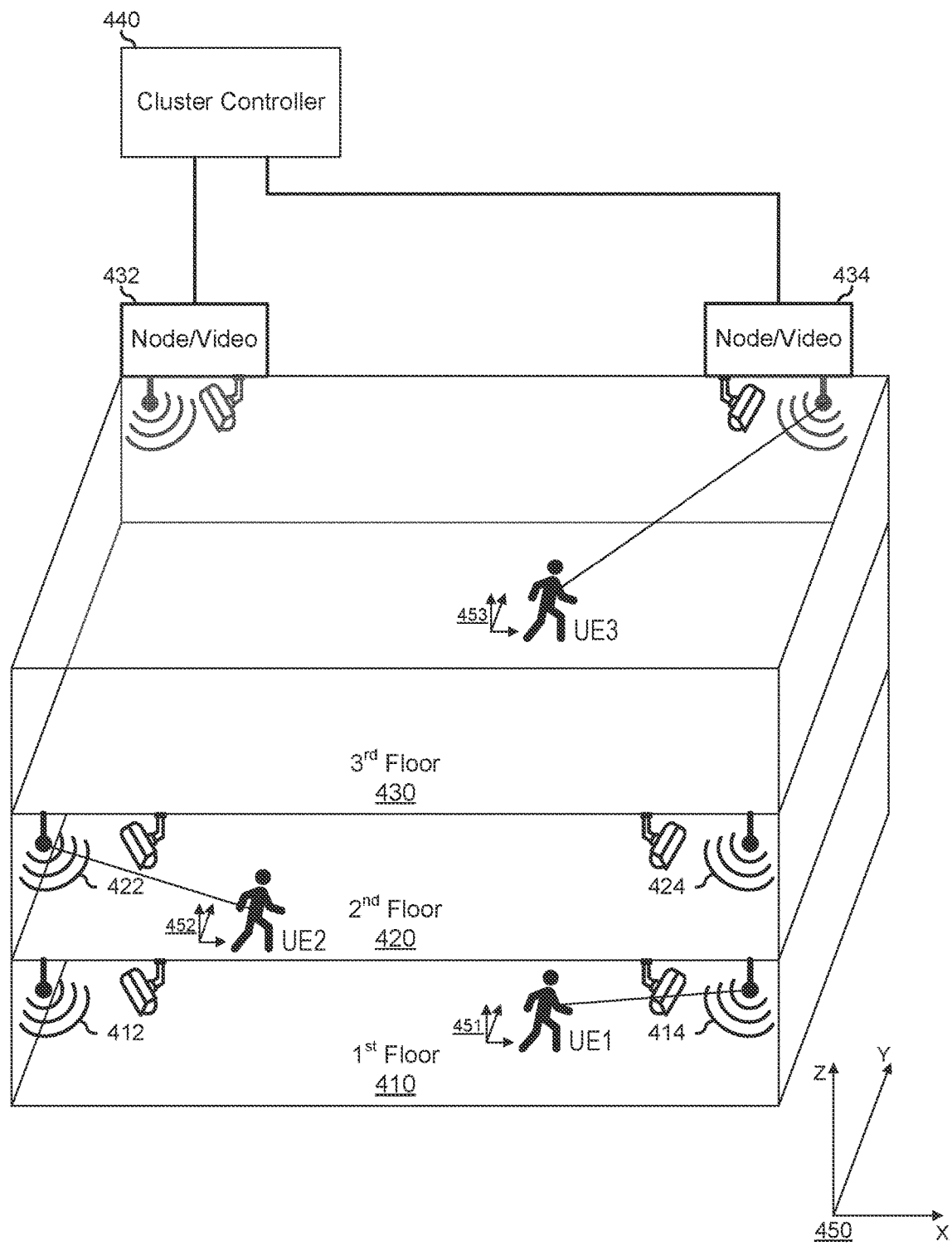
FIG. 4 is a block diagram of a data communication network according to another embodiment of the current disclosure.

FIG. 4 illustrates a data communication network 400 similar to data communication network 100. Data communication network 400 provides a RF coverage area for a structure, such as an office building, a shopping mall, an apartment building, a home or other dwelling, or other type of environment that can be characterized as inhabiting a 3D volume. As such, data communication network 400 provides the RF coverage area for a first floor 410, a second floor 420, and a third floor 430. First floor 410 includes data communication nodes/imaging devices 412 and 414, second floor 420 includes data communication nodes/imaging devices 422 and 424, and third floor 430 includes data communication nodes/imaging devices 432 and 434. Data communication nodes/imaging devices 412, 414, 422, 424, 432, and 434 (hereinafter referred to as "nodes") represent data communication and imaging devices that combine the functions and features of nodes 120 and imaging devices 130, as described above. Nodes 412, 414, 422, 424, 432, and 434 are each connected to a cluster controller 440 similar to cluster controller 110, as described above.

Nodes 412 and 414 provide network connectivity and imaging data primarily for UEs on first floor 410, nodes 422 and 424 provide network connectivity and imaging data primarily for UEs on second floor 420, and nodes 432 and 434 provide network connectivity and imaging data primarily for UEs on third floor 430. Thus while not strictly precluded, network connectivity provided to UEs outside the bounds of their respective floors is incidental to the teachings of the current disclosure, and therefore will not be discussed further unless otherwise needed to illustrate the current embodiments. In addition to nodes 412 and 414, first floor 410 may include one or more additional nodes, one or more additional stand-alone data communication devices, and one or more additional stand-alone imaging devices, as needed or desired. Similarly, second floor 420 and third floor 430 may include one or more additional nodes, one or more additional stand-alone data communication devices, and one or more additional stand-alone imaging devices, as needed or desired. The teachings of the current disclosure with respect to FIGS. 1 and 2, as described above, may be incorporated into data communication network 400 unless otherwise described herein, and the teachings related to data communication network 400 may be able to be incorporated into data communication network 100, as needed or desired.

It has been understood by the inventors of the current disclosure that wireless communication technologies are rapidly being integrated into businesses, residences, retail spaces, event venues, and the like. Further, the need for positioning information for the UEs within such locations is increasing in order to provide richer user environments. However, such locations may typically be characterized as being GPS-compromised, or as being otherwise lacking in precise positioning capabilities. It has been further understood that precise positioning in indoor or other GPS-compromised environments typically requires the use of separate beacons added to the environments, or the use of military-grade GPS devices, both of which unduly add to the cost of deployment to the data communication network.

Data communication network 400 utilizes cluster controller 440 to receive image data from nodes 412, 414, 422, 424, 432, and 434, along with the RF coverage map from the nodes to provide a precise 3D map of the physical topology of the RF coverage area of the data communication network. Due to the segregated nature of the image information from first floor 410, from second floor 420, and from third floor 430, the 3D map can easily distinguish between a UE on the first floor (UE1), a UE on the second floor (UE2), and a UE on the third floor (UE3).

Data communication network 400 is illustrated as being oriented with respect to a 3D coordinate system 450. In this regard, UE1 can be located in coordinate system 450 at a location 451 by nodes 412 and 414, UE2 can be located in the coordinate system at a location 452 by nodes 422 and 424, and UE3 can be located in the coordinate system at a location 453 by nodes 432 and 434. In this way, precise location information can be provided for UEs within the RF coverage area, including height information, as needed or desired. In particular, the use of multiple nodes, and especially the imaging device portions of the nodes, permits the imaging information to provide the 3D map, including the precise location information and the height information.

As depicted in FIG. 4, data communication network 400 provides a RF coverage area within a confined space, such as within a building, but this is not necessarily so. In particular, the teachings of the current disclosure are amenable to providing precise location information for UEs within the RF coverage area for other types of locations. For example, a shopping mall may have one or more large open spaces, such that the imaging devices provide image information for more than one floor. The 3D map of the coverage area may still be utilized to provide precise location information, including height information, as needed or desired. In another example, a stadium environment, with no clear "floors" in the seating areas, may nevertheless provide precise location information for the UEs within the stadium based upon the 3D map of the stadium, as needed or desired.

With precise location information, UEs can be provided with more precise location services. For example, where the RF coverage area represents a multi-floor building, such as a shopping mall, a user may query for a particular location within the mall (for example, a store, a food court, a parking garage, etc.), and, based upon the 3D map of the mall, the user may be provided with step-by-step directions, including floor changes, to the desired location, as needed or desired.

The current embodiments may provide the precise location services without necessitating specialized UEs to receive high precision GPS or the like, and without necessitating specialized nodes, as access points and wireless routers are increasingly being provided with integrated video imaging devices. Moreover, as the operating frequency of modern wireless communications increases, the number of deployed nodes is increasing, permitting the greater utilization of the image information to provide more detailed 3D mapping, as needed or desired.

Figure 5:
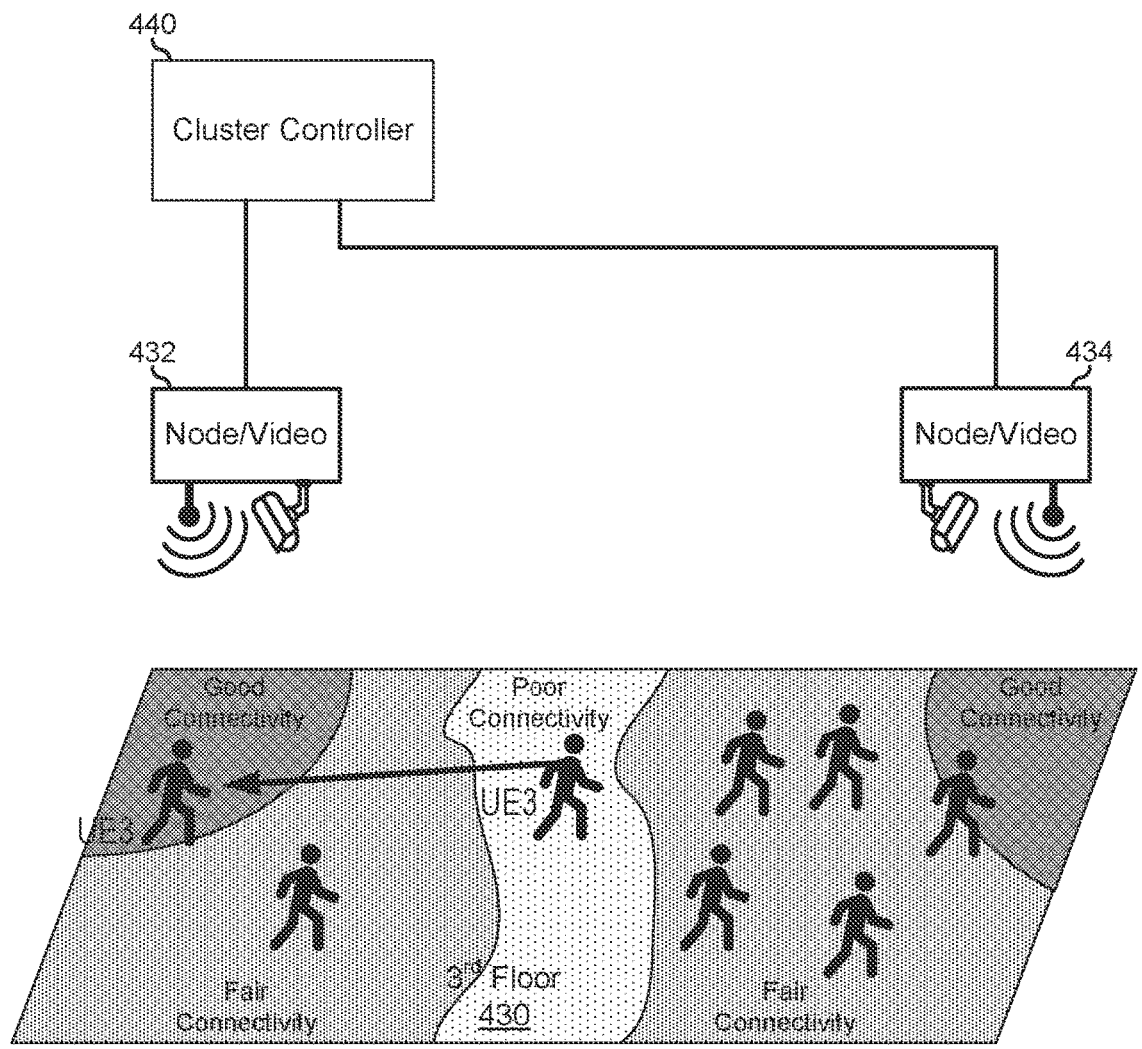
FIG. 5 illustrates a portion of the data communication network of FIG. 4.

FIG. 5 illustrates a portion of data communication network 400. In particular, FIG. 5 illustrates third floor 430 with nodes 432 and 434, and UE3. The X-Y surface of third floor 430 is illustrated with a connectivity pattern for the quality of connectivity provided in various regions of the third floor. In particular, third floor 430 is illustrated as having a first "Good Connectivity" zone close to node 432, a "Fair Connectivity" zone further removed from node 432, a "Poor Connectivity" zone between node 432 and node 434, another "Fair Connectivity" zone closer to node 434, and another "Good Connectivity" zone close to node 434. The connectivity zones are analogous to the "number of bars" indication for signal strength on a particular UE device. However, cluster controller 440 operates to correlate the "number of bars" indications from multiple UEs with the 3D map of the RF coverage area of data communication network 400 to determine the precise bounds of the connectivity zones. The number of different levels of connectivity of the connectivity zones may differ from the three level illustrated here (that is, good, fair, and poor), as needed or desired. The indications of signal quality may include Received Signal Strength Indications (RSSI) or other indications, as may be known in the art.

It has been understood by the inventors of the current disclosure that the a user's typical options for finding better signal coverage are limited to wandering around, looking at the user's UE to see when the "number of bars" indicator increases, and stopping in the spot with the most bars.

In a particular embodiment, UEs interact with data communication network 400 to receive near real time indications as to where to find better signal strength based upon the 3D map of the RF coverage area, and the associated connectivity pattern for the quality of connectivity provided in various regions of the RF coverage area. Thus, for example, UE3, finding itself in the "Poor Connectivity" zone, receives a direction indication to move toward one of the "Good Connectivity" zones associated with node 432 and 434. In a simple space, such as a room, the direction indication may include a compass-pointer type indication pointing to the "Good Connectivity" zones. In a more complex space, such as a floor of office cubicles, the direction indication may include turn-by-turn directions to the "Good Connectivity" zone.

The current embodiment is illustrated with respect to a particular floor in a building, but this is not necessarily so. In particular, direction indications can be provided for indoor spaces, outdoor spaces, or mixed spaces, as needed or desired. In a particular example, a RF coverage zone may include a park and various adjacent businesses that include access points associated with the data communication network. The park area may have poorer connectivity, but a nearby business with an access point may provide improved connectivity. In this case, the UE can be provided with an indication such as "Proceed to business X for improved connectivity." Further, the direction indications may be visual indications, audio indications, haptic indications, or the like.

In a particular embodiment, data communication network 400 incorporates bandwidth utilization information in the determination of the direction indications. For example, third floor 430 is illustrated as having a larger number of UEs proximate to node 434. While both node 432 and node 434 are both associated with their own "Good Connectivity" zones, cluster controller 440 operates to determine that the available bandwidth on node 432 is greater than on node 434. In this case, cluster controller 440 operates to direct UE3 to the "Good Connectivity" zone associated with node 432.

It has been further understood by the inventors of the current disclosure that the indications received by UEs within the RF coverage area may vary with time, due to dynamic interactions with the surrounding environment, bandwidth usage between other UEs within the RF coverage area and the nodes, and other factors. Thus, in a particular embodiment, UEs within an RF coverage area operate to provide the current status of their signal strength indications. In this case, cluster controller 440 operates to modify the associated connectivity pattern for the quality of connectivity provided in various regions of the RF coverage area based upon the received signal strength indications to provide more real time indications as to where to find better signal strength.

An example of rendering a 3D map of the physical topology, as described in the various embodiments of the current disclosure, may include correlating multiple imaging inputs 210 utilizing a Neural Radiant Field (NeRF) algorithm, a Structure from Motion (SfM) algorithm, or the like.

Figure 3:
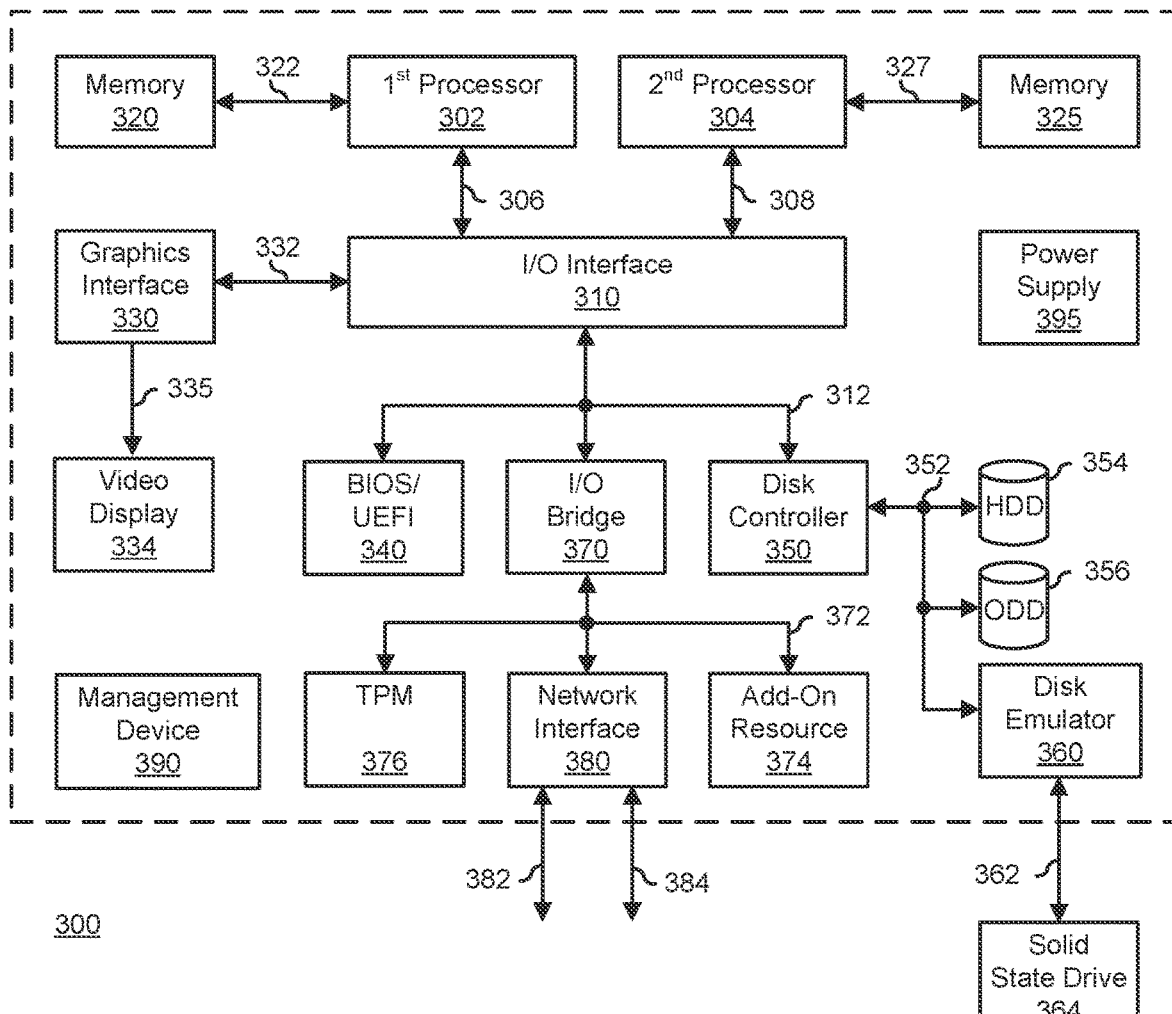
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication network, comprising:
   a first data communication node configured to establish a first data connection with a user equipment device within a coverage area of the data communication network;
   a plurality of imaging devices configured to provide image information for the coverage area; and
   an information handling system coupled to the first data communication node and to the imaging devices, wherein the information handling system is configured to receive the image information, to synthesize a three-dimensional (3D) map of the coverage area based upon the image information, to receive first coverage information from the first data communication node, to correlate the first coverage information with the 3D map to generate a coverage map of the coverage area, to generate a first connectivity pattern associating a quality of connectivity provided by the first data communication node within the coverage area, and to determine a first location of the first user equipment device within the first connectivity pattern based on the image information.

2. The data communication network of claim 1, wherein the information handling system is further configured to determine that the first location is associated with a first level of quality of connectivity.

3. The data communication network of claim 2, wherein the information handling system is further configured to determine that the first connectivity pattern includes a second location that is associated with a second level of quality of connectivity, the second level of quality being greater than the first level of quality.

4. The data communication network of claim 3, wherein the information handling system is further configured to provide directions to the user equipment device to the second location.

5. The data communication network of claim 3, further comprising:
   a second data communication node;
   wherein the information handling system is further configured to generate a second connectivity pattern associating a quality of connectivity provided by the second data communication node within the coverage area.

6. The data communication network of claim 5, wherein the information handling system is further configured to determine that the second connectivity pattern includes a third location that is associated with a third level of quality of connectivity, the third level of quality being greater than the first level of quality.

7. The data communication network of claim 6, wherein the information handling system is further configured to provide directions to the user equipment device to the third location, and to direct the second data communication node to establish a second data connection with the user equipment device at the third location.

8. The data communication network of claim 7, wherein:
the second level of quality is greater than the third level of quality; and
the information handling system is further configured to determine that a first bandwidth utilization of the first data communication node is greater than a second bandwidth utilization of the second data communication node, wherein providing the directions to the user equipment device to the third location is in response to determining that first bandwidth utilization is greater than the second bandwidth utilization.

9. A method, comprising:
providing, in a data communication network, a first data communication node configured to establish a first data connection with a user equipment device within a coverage area of the data communication network;
providing, in the data communication network, a plurality of imaging devices configured to provide image information for the coverage area; and
providing, in the data communication network, an information handling system coupled to the first data communication node and to the imaging devices;
receiving, by the information handling system, the image information;
synthesizing a three-dimensional (3D) map of the coverage area based upon the image information;
receiving first coverage information from the first data communication node;
correlating the first coverage information with the 3D map to generate a coverage map of the coverage area; and
generating a first connectivity pattern associating a quality of connectivity provided by the first data communication node within the coverage area;
determining a first location of the first user equipment device within the connectivity pattern based on the image information.

10. The method of claim 9, further comprising:
determining that the first location is associated with a first level of quality of connectivity.

11. The method of claim 10, further comprising:
determining that the first connectivity pattern includes a second location that is associated with a second level of quality of connectivity, the second level of quality being greater than the first level of quality.

12. The method of claim 11, further comprising:
providing directions to the user equipment device to the second location.

13. The method of claim 11, further comprising:
providing, in the data communication network, a second data communication node; and
generating a second connectivity pattern associating a quality of connectivity provided by the second data communication node within the coverage area.

14. The method of claim 13, further comprising:
determining that the second connectivity pattern includes a third location that is associated with a third level of quality of connectivity, the third level of quality being greater than the first level of quality.

15. The method of claim 14, further comprising:
provide directions to the user equipment device to the third location; and
directing the second data communication node to establish a second data connection with the user equipment device at the third location.

16. The data communication network of claim 15, wherein:
the second level of quality is greater than the third level of quality; and
the method further comprises determining that a first bandwidth utilization of the first data communication node is greater than a second bandwidth utilization of the second data communication node, wherein providing the directions to the user equipment device to the third location is in response to determining that first bandwidth utilization is greater than the second bandwidth utilization.

17. An information handling system, comprising:
a memory device for storing code; and
a processor configured to execute the code to:
receive image information from a plurality of imaging devices of a data communication network;
synthesize a three-dimensional (3D) map of a coverage area of the data communication network based upon the image information;
receive first coverage information for a first coverage area of the data communication network from a first data communication node of the data communication network;
correlate the first coverage information with the 3D map to generate a coverage map of the coverage area;
generate a first connectivity pattern associating a quality of connectivity provided by the first data communication node within the coverage area; and
determine a first location of a first user equipment device within the connectivity pattern based on the image information.

18. The information handling system of claim 17, wherein the processor is further configured to execute code to determine that the first location is associated with a first level of quality of connectivity.

19. The information handling system of claim 18, wherein the processor is further configured to execute code to determine that the first connectivity pattern includes a second location that is associated with a second level of quality of connectivity, the second level of quality being greater than the first level of quality.

20. The information handling system of claim 19, wherein the processor is further configured to execute code to provide directions to the user equipment device to the second location.

* * * * *